UNITED STATES PATENT OFFICE.

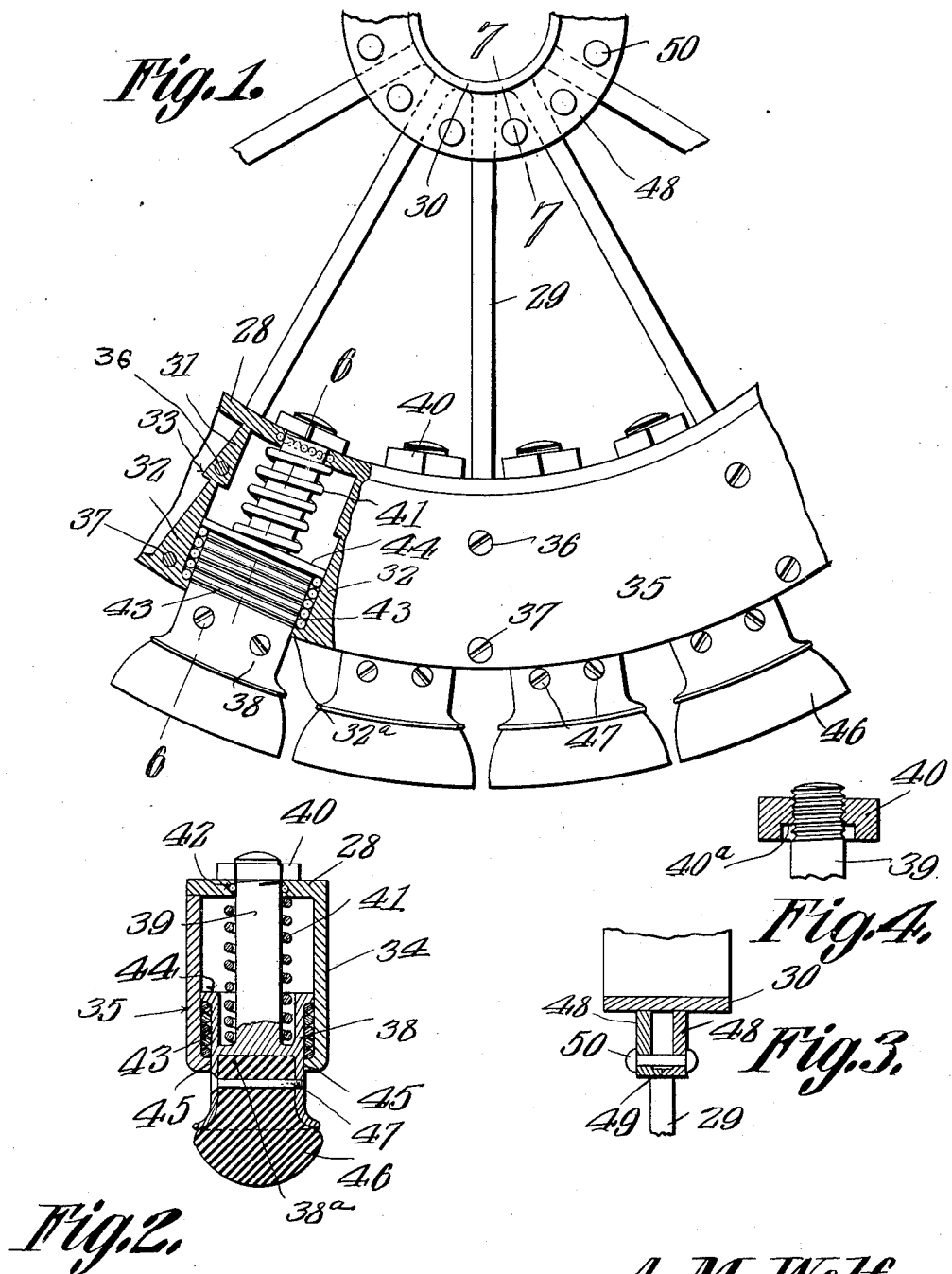

ADAM M. WOLF, OF PLYMOUTH, WISCONSIN.

SPRING-WHEEL.

1,095,257.  Specification of Letters Patent.  Patented May 5, 1914.

Application filed December 7, 1911.  Serial No. 664,432.

*To all whom it may concern:*

Be it known that I, ADAM M. WOLF, a citizen of the United States, residing at Plymouth, in the county of Sheboygan and State of Wisconsin, have invented a new and useful Spring-Wheel, of which the following is a specification.

This invention relates to spring wheels, and has for its object, as a specific improvement in a spring wheel, the provision of novel means for directing and controlling the movement of the tire holder in a spring wheel.

A further object of the invention is to improve generally, devices of that type to which the present invention appertains.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings, Figure 1 is a fragmental sectional side elevation of a wheel constructed in accordance with the present invention; Fig. 2 is a radial section on the line 6—6 of Fig. 1; Fig. 3 is a section upon the line 7—7 of Fig. 1; and Fig. 4 is a section of one of the securing nuts.

In carrying out the invention, there is provided a supporting structure, comprising a rim 28, carrying spokes 29, connected with a hub 30. As clearly shown in Fig. 3, the side plates 48 are applied to the spokes 29, the side plates having inwardly projecting flanges 49, closing the spaces between the spokes 29, the plates 48 being held in place by means of securing elements 50, taking the form of bolts or the like. Projecting radially from the rim 28, are guides, comprising wedge-shaped inner portions 31 and wedge-shaped outer portions 32, the wider ends of the parts 31 and 32 being disposed toward the periphery of the wheel, thereby to define, in the guides, reëntrant shoulders 33. The portions 32 of the guides are equipped at their outer ends with flanges 32ª, having functions which will be described hereinafter, these flanges 32ª extending transversely of the wheel.

Preferably formed integrally with the rim 28, is a fixed side plate 34. The invention further includes a removable side plate 35, held in place by means of securing elements 36, extended through the portions 31 of the guides and through the fixed side plate 34. The removable side plate 35 is further held in place by other securing elements 37, passing through the wedge-shaped ends 32 of the guides, and through the fixed side plate 34.

The tire-holders consist each of a rectangular, tubular socket 38, held for sliding movement between the plates 35 and 34, as clearly shown in Fig. 2. Extended across the sockets 38, intermediate the ends of the sockets, is a bridge plate 38ª, formed integrally with which is a stem 39, the stem passing through the rim 28. The stems 39 are threaded at their inner ends to receive nuts 40, adapted to engage the inner face of the rim 28, to prevent an outward movement of the tire-holders under the action of helical springs 41 which surround the stems 39 and bear at one end against the bridges 38ª, and at their other ends against the rim 28. The nuts 40 are recessed in their under faces, as shown at 40ª, so as to permit an adjustment of the nuts, without necessitating the threading of the stems 39 to such a degree that the threading will be injured by the movement of the stems in the rim 28. The stems 39 are anti-frictionally mounted in the rim 28, through the medium of balls 42, held in ball races in the rim. The rectangular, tubular socket 38 of the tire holder is surrounded by a substantially continuous inclosing structure, comprising anti-friction rollers 43, certain of which bear against the plates 34 and 35, others of which bear against the portions 32 of the guides, as shown in Fig. 1. The rollers are held in place by means of flanges 44, projecting outwardly from the bases of the sockets 38, other flanges 45 being formed upon the outer edges of the plates 34 and 35, to receive the rollers. Obviously, the flanges 32ª, hereinbefore referred to, and shown most clearly in Fig. 1, coöperate with the flanges 44 in retaining the rollers in place. A tire section 46 is held in each of the sockets 38, by means of securing elements 47 of any desired sort. It will be seen that the outward movement of the tire holders is limited not only by the engagement between the nut 40 and the rim 28, but, as well, by the engagement between the rollers 43 and the flanges 44, 45 and 32ª.

Having thus described the invention, what is claimed is:—

In a device of the class described, a supporting structure; radial guides projecting from the supporting structure and provided at their ends with outstanding flanges; tire holders mounted to slide between the guides and provided with outstanding flanges; cylinders located between the flanges of the holders and the flanges of the guides and coöperating with the flanges to limit the outward movement of the holders, the cylinders extending across the outer faces of the holders to form substantially continuous inclosing structures extended around the periphery of the holders, thereby to distribute the strain upon the cylinders when the same are engaged between the flanges; and spring means coöperating with the holders, to force the holders outwardly.

In testimony that I claim the foregoing as my own, I have hereto affixed my signature in the presence of two witnesses.

ADAM M. WOLF.

Witnesses:
OTTO BERGEMANN,
ELLA BRIESKE.

Copies of this patent may be obtained for five cents each, by addressing the "Commissioner of Patents, Washington, D. C."